United States Patent
Lapuh et al.

(10) Patent No.: US 7,751,329 B2
(45) Date of Patent: Jul. 6, 2010

(54) PROVIDING AN ABSTRACTION LAYER IN A CLUSTER SWITCH THAT INCLUDES PLURAL SWITCHES

(75) Inventors: Roger Lapuh, Thurgau (CH); Mohnish Anumala, Littleton, MA (US); Robert Lariviere, Boulder Creek, CA (US); Hamid Assarpour, Arlington, MA (US); Martin L. White, Sunnyvale, CA (US)

(73) Assignee: Avaya Inc., Basking Ridge, NJ (US)

( * ) Notice: Subject to any disclaimer, the term of this patent is extended or adjusted under 35 U.S.C. 154(b) by 289 days.

(21) Appl. No.: 11/906,668

(22) Filed: Oct. 3, 2007

(65) Prior Publication Data
US 2009/0092043 A1    Apr. 9, 2009

(51) Int. Cl.
H04L 12/28 (2006.01)
G01R 31/08 (2006.01)
G06F 11/00 (2006.01)

(52) U.S. Cl. .................. 370/235; 370/228; 370/395.2; 370/409; 709/239; 710/300

(58) Field of Classification Search .............. 370/228, 370/409, 360, 217, 225, 235, 256, 395.2; 709/220, 223, 226, 239; 710/300; 714/4, 714/43; 379/221.04
See application file for complete search history.

(56) References Cited

U.S. PATENT DOCUMENTS

| | | | |
|---|---|---|---|
| 6,175,566 B1 | 1/2001 | Hahn et al. | |
| 7,058,761 B2 | 6/2006 | Nakamura et al. | |
| 7,096,039 B2 | 8/2006 | Chuah et al. | |
| 7,178,052 B2 * | 2/2007 | Hebbar et al. ................ | 714/4 |
| 2003/0097470 A1 * | 5/2003 | Lapuh et al. ................. | 709/239 |
| 2003/0137932 A1 * | 7/2003 | Nishioka et al. ............. | 370/216 |
| 2005/0198445 A1 | 9/2005 | Fujimoto | |
| 2006/0059287 A1 * | 3/2006 | Rivard et al. ................ | 710/300 |
| 2008/0219268 A1 * | 9/2008 | Dennison ................. | 370/395.2 |

FOREIGN PATENT DOCUMENTS

| | | |
|---|---|---|
| KR | 10-1998-020693 | 6/1998 |
| KR | 10-2005-0089084 | 9/2005 |
| WO | WO2004/059467 | 7/2004 |

OTHER PUBLICATIONS

J. Osswald, entitled "Method and Apparatus for Increasing the Scalability of Ethernet OAM," filed Dec. 8, 2005.*

(Continued)

*Primary Examiner*—Afsar M. Qureshi
(74) *Attorney, Agent, or Firm*—Trop Pruner & Hu, P.C.

(57) ABSTRACT

In a communications network, a cluster switch is provided, where the cluster switch has plural individual switches. An abstraction layer is provided in the cluster switch, such that an interface having a set of ports is provided to upper layer logic in the cluster switch. The set of ports includes a collection of ports of the individual switches. Control traffic and data traffic are communicated over virtual tunnels between individual switches of the cluster switch, where each virtual tunnel has an active channel and at least one standby channel.

24 Claims, 7 Drawing Sheets

OTHER PUBLICATIONS

M. Poon, entitled "Communication Data Units in a Communication Network that provides failure Protection," filed Dec. 20, 2006.* http://en.wikipedia.org/wiki/802.1ah, "802.1ah" definition from Wikipedia, p. 1 (at least as early as Nov. 2, 2006).

http://en.wikipedia.org/wiki/Provider_Backbone_Transport, "Provider Backbone Transport," definition from Wikipedia, p. 1 (at least as early as Nov. 2, 2006).

Network Working Group, Internet Draft, "Application of PWE3 to MPLS Transport Networks, draft-bryant-pwe3-mpls-transport-00," pp. 1-12 (Oct. 13, 2006).

Nortel White Paper, "Adding Scale, QoS and Operational Simplicity to Ethernet," pp. 1-8 (2006).

TPACK A/S, "PBT Carrier Grade Ethernet Transport," 17 pages. (2006).

SysKonnect White Paper, "Link Aggregation according to IEEE 802.3ad," 19 pages. (2002).

J. Osswald, U.S. Appl. No. 11/298,822, entitled "Method and Apparatus for Increasing the Scalability of Ethernet OAM," filed Dec. 8, 2005, pp. 1-16, Figs. 1-8.

J. Osswald et al., U.S. Appl. No. 11/642,202, entitled "Communication Data Units in a Communications Network that Provides Failure Protection," filed Dec. 20, 2006, pp. 1-23, Figs. 1-5.

Korean Patent Office, International Search Report and Written Opinion for International Application No. PCT/US2008/070958, 9 pages, Jan. 29, 2009.

* cited by examiner

PROVIDING AN ABSTRACTION LAYER IN A CLUSTER SWITCH THAT INCLUDES PLURAL SWITCHES

TECHNICAL FIELD

The invention relates generally to providing an abstraction layer to provide a cluster switch having plural switches.

BACKGROUND

In many enterprises (e.g., companies, governmental organizations, educational or research organizations, and so forth), communications networks are implemented to enable the transport of information among users and devices. Examples of such networks include local area networks (LANs), wide area networks, the Internet, and so forth. Communications networks typically include switching nodes (such as Ethernet switches) that are able to receive packets, read the target address of each received packet, and forward each packet to the appropriate port associated with the target network segment.

Multilink trunking or aggregation techniques are often used to allow bundling of sets of parallel physical links into aggregated logical trunks. Examples of techniques that allow for such bundling of physical links into aggregated logical trunks include multilink trunking (such as multilink trunking defined by the Split Multilink Trunking Architecture developed by Nortel Networks Limited) or the link aggregation technique defined by the Institute of Electrical and Electronics Engineers (IEEE) 802.3. SMLT allows for an aggregated network trunk to be split between different physical switches to provide a more robust network solution due to switch redundancy.

Current multilink trunking or link aggregation techniques are hardware dependent and involve heavy interlinking between the lower protocol layers (that enable the multilink trunking or link aggregation) and upper protocol layers. Such interlinking between the lower and upper protocol layers means that support for upper protocol layers would have to be modified in response to modifications to implementation of the lower protocol layers. As a result, product development of software for upper protocol layers is made more complex.

SUMMARY

In general, according to one embodiment, a method for use in a communications network includes providing an abstraction layer in a virtual cluster switch that includes plural individual switches. Moreover, the method includes communicating, control traffic and data traffic over virtual tunnels between individual switches of the cluster switch, where each virtual tunnel has an active channel and at least one standby channel. The abstraction layer presents an interface having a set of ports to upper layer logic in the cluster switch, where the set of ports includes a collection of ports of the individual switches.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

In accordance with some embodiments of the invention, a logical "cluster switch" or "virtual cluster switch" is provided that includes multiple physical switches ("individual switches"). Effectively, the virtual cluster switch is a logical switch that is made up of multiple individual switches. The term "switch" as used herein can refer to either a layer 2 switch or a layer 3 router. The cluster switch includes an abstraction layer that provides a common control infrastructure that manages the individual switches in the cluster switch. Use of the abstraction layer allows for the underlying physical infrastructure to be hidden to logic of upper protocol layers such that management of the network is simplified and development of software for upper protocol layers can be more easily accomplished.

In the abstraction layer, the interface presented in the cluster switch to logic of upper protocol layers includes a set of ports that is a virtual collection of the ports of the individual switches. Thus, the logic (e.g., various software modules) of the upper protocol layers is able to access any of the set of ports of the cluster switch.

A communications network can include multiple cluster switches that are coupled to clients. In one implementation, clients can be edge switches that are coupled to respective end stations, such as a customer premise equipment (CPE). An edge switch is located at the edge of a network, and end stations are directly or indirectly (e.g., through a hub or another switch) connected to the edge switch.

Figure 1A:
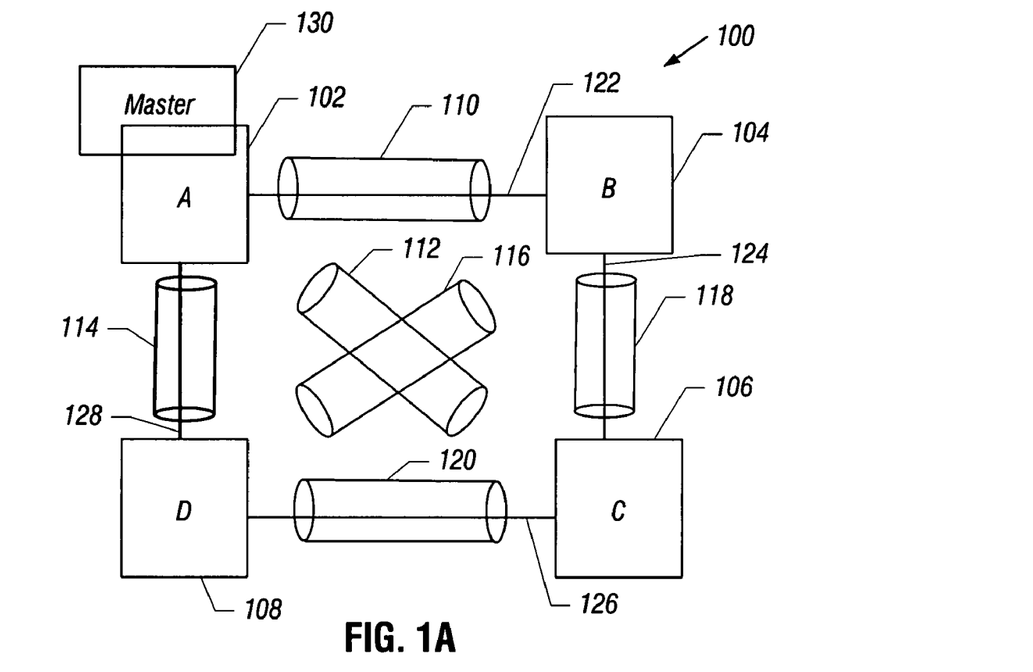
FIGS. 1A-1C illustrate a cluster switch according to an embodiment.

As depicted in FIG. 1A, a cluster switch 100 includes multiple individual switches 102, 104, 106, and 108 (referred to as individual switches A, B, C, and D). Examples of the individual switches 102, 104, 106, and 108 include Ethernet switches. However, the individual switches can also include IP (Internet Protocol) routers to further perform IP routing and other tasks.

As further depicted in FIG. 1A, virtual tunnels 110, 112, 114, 116, 118, 120 are used to interconnect the individual switches of a cluster switch 100. The interconnection arrangement of FIG. 1A is a full-mesh interconnection arrangement in which each individual switch is interconnected to each other individual switch. Each individual switch is coupled over three active tunnels to respective other individual switches in the cluster switch 100. Thus, for example, individual switch A is coupled over tunnels 110, 112, and 114 to individual switches B, C, and D, respectively. Similarly, switch B is coupled over tunnels 110, 116, and 118 to switches A, D, and C, respectively; switch C is coupled over tunnels 118, 112, and 120 to switches B, A, and D, respectively; and switch D is coupled over tunnels 114, 116, and 120 to switches A, B, and C, respectively.

Tunnels are bi-directional to allow bi-directional communication between the corresponding pair of individual switches. Each virtual tunnel includes multiple channels, including one active channel and one or plural standby channels. Control and data traffic is communicated over just the active channel, but not over the one or plural standby channels. Effectively, the virtual tunnel is the active logical channel.

Each channel in a tunnel has a predefined priority, and the channels are activated in the predefined priority order. However, only one channel in a tunnel can be active at a given time, with the remaining channel(s) in standby mode. In accordance with the predefined priority order, a lower priority channel can only be active when all higher priority channel(s) has (have) failed. Moreover, when a higher priority channel is restored (from a failed state to a functional state), this restored higher priority channel takes precedence over a lower priority channel; in other words, the restored higher priority channel becomes the active channel, while the previously active lower priority channel is set to be a standby channel.

From the perspective of each individual switch in the cluster switch 100, the individual switches are connected in a star topology, according to an embodiment. For example, as depicted in FIG. 1C, switch A is connected to switches D, C, and B, in a star topology over tunnels 114, 112, and 110, respectively. As further depicted in FIG. 1C, each tunnel has one active channel (represented by a solid bi-directional arrow), and a standby channel (represented by a dashed bi-directional arrow). Thus, in the tunnel 114 between switches A and D, a primary channel d1 is defined, and a standby channel d2 is defined. Similarly, in the tunnel 112 between switches A and C, a primary channel c1 and standby channel c2 are defined. In the tunnel 110 between switches A and B, a primary channel b1 and a standby channel b2 are defined.

Figure 1B:
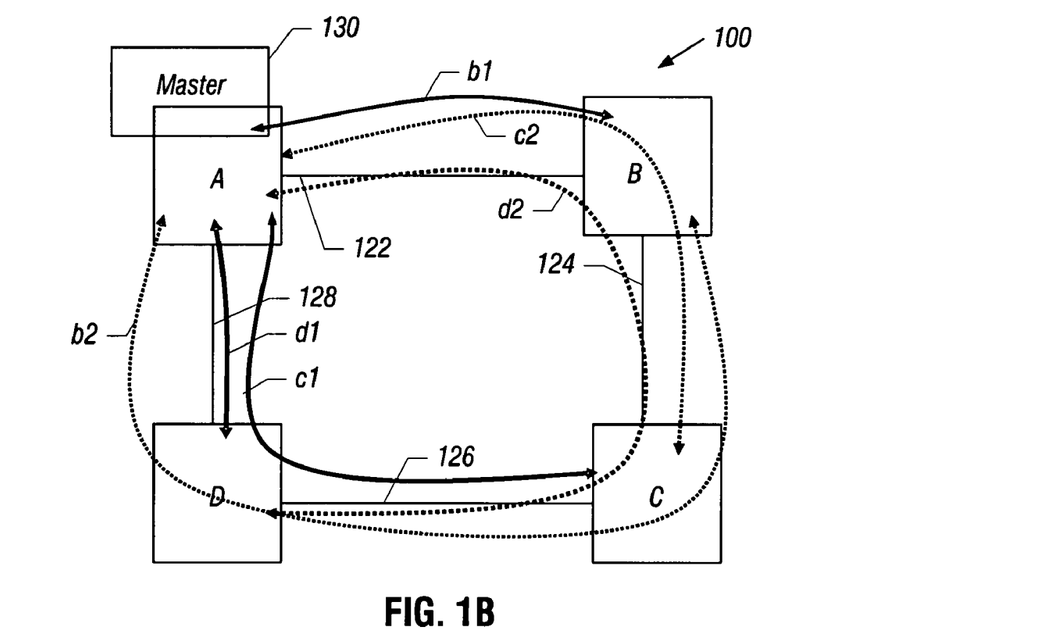
Figure 1C:
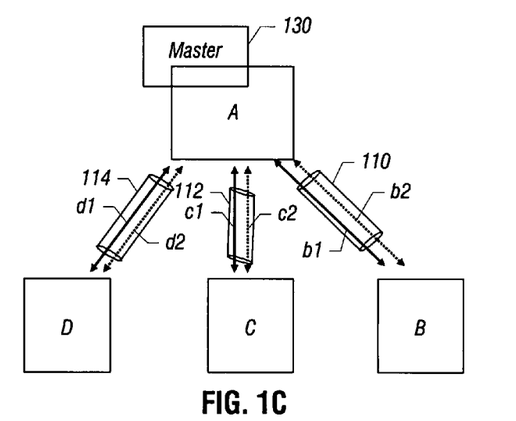

FIG. 1B illustrates the actual physical paths of the various primary and standby channels depicted in FIG. 1C. Note that switches A, B, C, and D are interconnected by physical links 122, 124, 126, and 128. Each physical link can be a link between two ports of corresponding endpoints, an aggregated link (aggregation of multiple links, such as that defined by IEEE 802.3), a multilink trunk (MLT, as defined by IEEE 802.3), or any other type of link. An MLT includes multiple parallel point-to-point links that connect two switches. Thus, a logical channel connects two endpoints over a physical port or over an aggregated link or multilink trunk.

The primary and standby channels of the virtual tunnels are logical channels that can be defined on one or plural physical links. Thus, for example, a channel defined between switches A and C would not be over a direct physical link between switches A and C, but rather would pass through an intermediate switch B. As depicted in FIG. 1B, the standby channel c2 passes through switch B between switches A and C. In other words, the standby channel c2 is defined on two physical links 122 and 124. Similarly, the primary channel c1 passes through intermediate switch D between switches A and C (primary channel c1 is defined on physical links 128 and 126).

The primary channel between switches A and B is b1, which is defined on one physical link 122 between switches A and B. However, the associated standby channel b2 passes through two intermediate switches C and D to interconnect switches A and B (standby channel b2 is defined on three physical links 128, 126, and 124). In such an example, channel b1 would be assigned a higher priority than channel b2, since channel b1 is the shorter path between switches A and B, as compared to channel b2. In other words, for the tunnel 110 between switches A and B, if both channels b1 and b2 are functional (not in a failed state), then channel b1 would be set as the active channel, while channel b2 would be set as the standby channel since channel b1 has the higher priority.

Note that only the channels interconnecting switch A to the other three switches are depicted in FIG. 1B. Channels interconnecting switches B, C, and D to each other are not depicted in FIG. 1B—in other words, the channels of tunnels 116, 118, and 120 (FIG. 1A) are not shown in FIG. 1B.

In accordance with some embodiments, note that the route, including corresponding physical link(s), of each logical channel is predefined and static and does not change. By not using a dynamic routing protocol in which routes can change, stability of the virtual cluster switch is enhanced.

The integrity of each channel in the cluster switch 100 is maintained by using a channel keep-alive mechanism. As discussed further below, each channel runs its own integrity check (performed by each respective individual switch). In case of failure detected by a tunnel integrity check, each individual switch selects another logical channel according to the predefined priority order as the active channel. Each individual switch selects the active logical channel independently of other individual switches. The selection mechanism is fully distributed (in other words, the selection of active channels is performed independently by the individual switches) to enhance reliability and resiliency of the overall system, and to avoid single points of failure.

Selection of active channels can be accomplished in an asynchronous manner during a transition phase. A transition phase occurs in response to failure detection (of a channel) and involves individual switches transitioning to different active channels. During the transition phase, one individual switch can use one active channel in one direction, while the peer individual switch can select a different active channel in the other direction. However, both of them use the same virtual tunnel. The ability to asynchronously select the channel to use between peer switches enhances robustness of the overall system during transition phases.

As further depicted in FIGS. 1A-1C, a master module 130 is provided that manages the entire virtual cluster switch 100. Note that each of the individual switches 102, 104, 106, and 108 in the cluster switch 100 has a number of ports that connect to clients (not shown in FIGS. 1A-1C). For example, each switch 102, 104, 106, and 108 can include N ports (where N≧1). As depicted in FIGS. 1A-1C, the master module 130 is provided in switch A. Note, however, in other implementations, the master module 130 can be implemented in any of the other switches.

The ports of the individual switches are combined to provide a larger set of ports that is managed by the master module 130. Thus, from the perspective of external nodes (e.g., clients or other cluster switches) that are connected through the cluster switch 100, such external nodes observe an extended set of ports that are a combination (collection) of the ports of the individual switches 102, 104, 106, and 108. In the cluster switch 100, control plane traffic flows through the master module 130.

Effectively, the master module 130 provides the abstraction layer that hides the lower layer protocol infrastructure associated with the cluster switch 100. The lower layer protocol infrastructure is the infrastructure that provides the virtual tunnels and messaging interface through virtual tunnels between individual switches. The master module 130 interacts with layer 3 and higher layer logic in the cluster switch 100. Examples of layer 3 and higher layer logic in the cluster switch 100 include the following: logic for implementing the Spanning Tree Protocol (which is a link management protocol that provides path redundancy while preventing undesirable loops in the network, with the Spanning Tree Protocol defining a tree that spans all switches in an extended network, as defined by IEEE 802.1D); Simple Network Management Protocol (SNMP) logic that enables network elements to monitor network devices for conditions so that network administrators can be notified (as defined by RFC 1157, entitled "A Simple Network Management Protocol (SNMP)," dated May 1990); logic for virtual local area network (VLAN), which creates independent logical networks within a physical network; Address Resolution Protocol (ARP) logic to find the hardware address of a host when only the network layer address of the host is known (described by RFC 826, entitled "An Ethernet Address Resolution Protocol," dated November 1982); Routing Information Protocol (RIP) logic to help routers dynamically adapt to changes of network connections by communicating information about which networks each router can reach and how far away those networks are (described in RFC 2453, entitled "RIP Version 2," dated November 1998); Opening Shortest Path First (OSPF) protocol logic that is used for calculating a shortest path tree for purposes of network routing (described in RFC 2328, entitled "OSPF Version 2," dated April 1998, and RFC 2740 entitled "OSPF for IPv6," dated December 1999); and/or other upper protocol layer logic.

The abstraction layer (provided by the master module 130) provides a logical port interface to the upper protocol layers by simulating a logical cluster switch having a total of T ports, where T is equal to the sum of the N ports of corresponding to individual switches in the cluster switch. Thus, for example, if there are four individual switches in a cluster switch, then T=4*N. By using the master module 130 to provide the abstraction layer, the upper protocol layer logic sees each of the logical T ports as being just one hop away, even though physically a particular port may have to be reached over two or more physical links.

By providing the abstraction layer in the master module 130, the upper protocol layer logic does not have to be aware of the underlying lower protocol layer infrastructure of the cluster switch. Instead, the upper protocol layer logic interacts with the master module 130 so that the upper protocol layer logic does not have to be concerned with details of the lower protocol layer infrastructure.

Figure 2:
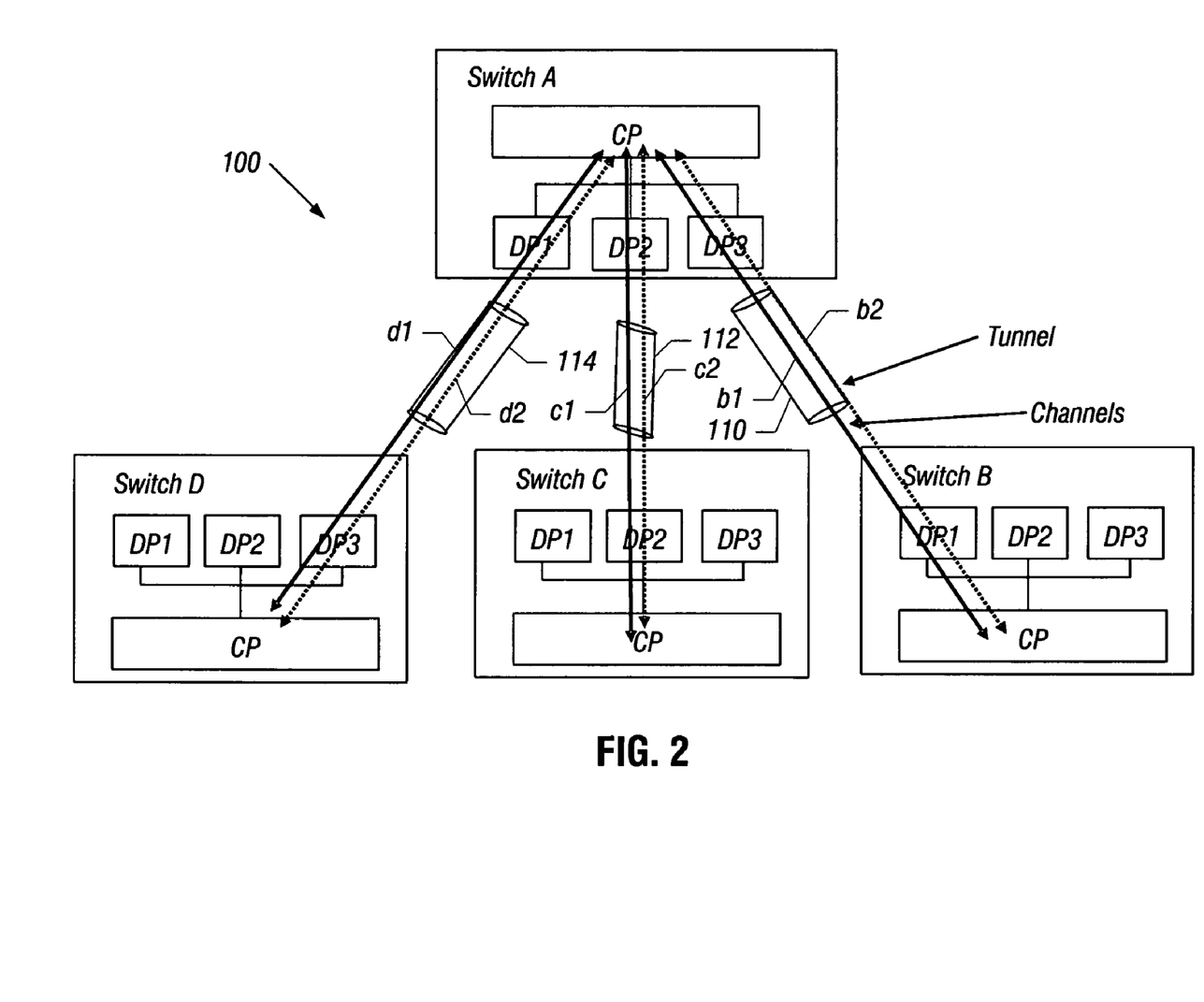
FIG. 2 is a block diagram of an example arrangement that depicts data planes and a control plane in individual switches of the cluster switch.

FIG. 2 depicts control planes and data planes in switches A, B, C, and D of the cluster switch 100. As depicted, both control plane and data plane traffic are communicated through the tunnels between respective pairs of individual switches. Each individual switch has a single control plane (labeled as "CP") and three data planes (labeled "DP1," "DP2," and "DP3"). The three data planes, DP1, DP2, and DP3 are used for data communication over corresponding tunnels with respective switches. Although three data planes are depicted as being in each individual switch, note that just one data plane can be provided for communication over multiple tunnels in an alternative implementation.

Figure 3:
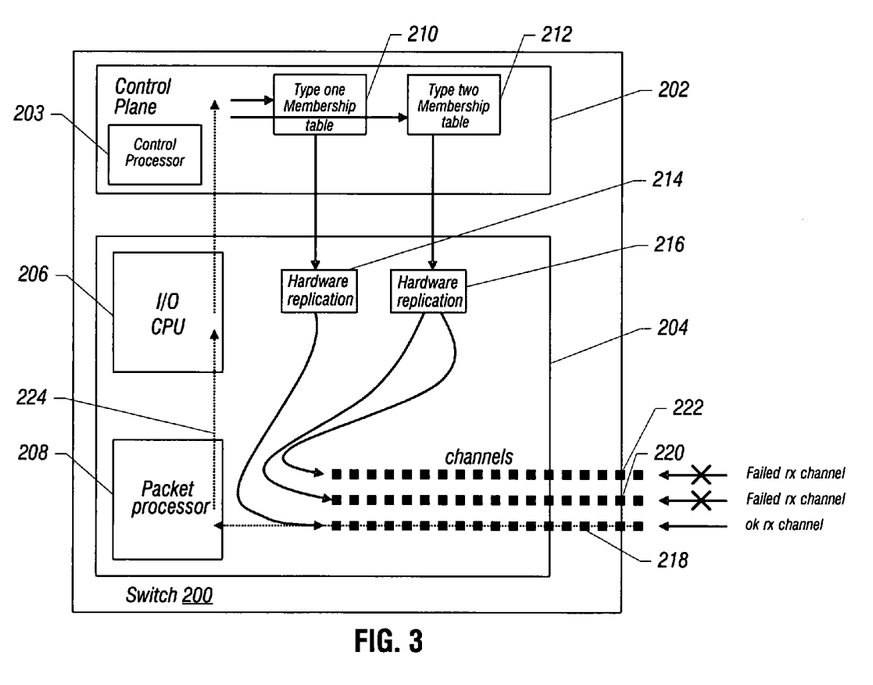
FIG. 3 is a block diagram of components within an individual switch, according to an embodiment.

FIG. 3 depicts components that are part of a keep-alive mechanism in a particular individual switch 200, which can be any of switches A, B, C, D depicted in FIGS. 1A-1C and 2. The switch 200 has a control plane 202 and a data plane 204. The data plane 204 has an input/output (I/O) central processing unit (CPU) 206, and a packet processor 208. The packet processor 208 is used for processing packets communicated between the switch 200 and other individual switches in the cluster switch. The I/O CPU 206 performs general I/O management tasks for communication between the switch 200 and another individual switch in the cluster switch, or between the switch and an external node. In alternative implementations, the I/O CPU 206 and packet processor 208 can be combined into a single processor.

The control plane 202 includes a control processor 203, and stores two tables: type 1 membership table 210 and type 2 membership table 212. The type 1 membership table 210 maintains a list of functional active channels to which the switch 200 is connected, whereas the type 2 membership table 212 maintains a list of failed channels to which the switch 200 is connected.

The I/O CPU 206 and/or packet processor 208 is able to generate two types of keep-alive packets: a type 1 packet to indicate that a particular channel is functional; and a type 2 packet to indicate that a particular channel is down. The switch 200 generates these two types of packets every keep-alive interval.

Using hardware replication logic (214, 216 in FIG. 3) in the data plane 204, one type 1 keep-alive packet and two type 2 keep-alive packets are sent over the channels. In the example of FIG. 3, three channels 218, 220, and 222 are depicted. In the example, channels 220 and 222 are considered failed channels because the switch 200 has not received keep-alive packets from a peer switch within some predefined timeout period. Channel 218 is considered a functional channel because the switch 200 has received a keep-alive packet from the peer switch over the channel 218. To indicate failure of the channels 220, 222, the switch 200 sends type 2 keep-alive packets over these channels to its peer switch, to basically inform the peer switch that "I can't hear you" (i.e., the switch 200 has not received keep-alive packets within time-out periods from the peer switch). On the other hand, a type 1 keep-alive packet is sent over the functional channel 218 to inform the peer switch that "I can hear you" (i.e., the switch 200 has successfully received a keep-alive packet from the peer switch).

The same procedure is performed over channels between the switch 200 and each of other peer switches in the cluster switch. Sending the type 2 keep-alive packets over the failed channels allows for the peer switch to be aware of the bi-directional channel status (to let the peer switch know that a particular channel is down in a first direction even though the peer switch has successfully received packets in the opposite direction over the particular channel).

Hardware replication logic 214, 216 is provided to reduce loading on software in the control plane 202. The hardware replication logic 214, 216 is able to transmit the appropriate keep-alive packets at appropriate times.

If a status of any of the particular channels should change (from functional to failed or vice versa), then an update 224 is sent from the data plane 204 to the control plane 202 to update the type 1 and type 2 membership tables 210, 212. The I/O CPU 206 and/or packet processor 208 monitors the status of the channels, and in response to detecting a channel status change, sends an update message to the control plane 202 to modify a channel status.

Figure 4:
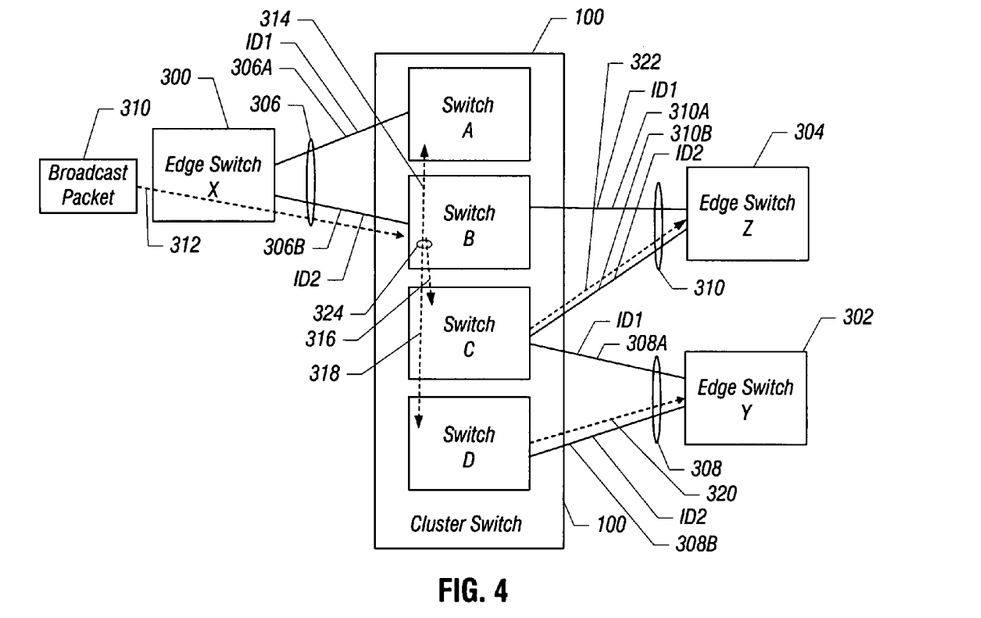
FIG. 4 is a block diagram to illustrate communication of a packet through the cluster switch, in accordance with an embodiment.

FIG. 4 shows a cluster switch 100 connected to three clients 300, 302, and 304. The clients 300, 302, and 304 are edge switches (edge switch X, edge switch Y, and edge switch Z). Each of the edge switches 300, 302, and 304 are connected over respective aggregated links 306, 308, 310 (or multilink trunks) to individual switches of the cluster switch 100. Each aggregated link 306, 308, and 310 is thus split between two individual switches. The aggregated link 306 interconnecting edge switch X to the cluster switch 100 includes one link member 306A that is connected to switch A, and another link member 306B that is connected to switch B. Similarly, the aggregated link 308 interconnecting edge switch Y with the cluster switch 100 includes one link member 308A connected to switch C and another link member 308B connected to switch D. The aggregated link 310 that interconnects edge switch Z to the cluster switch 100 has one link member 310A connected to switch B and another link member 310B connected to switch C. The split links of each aggregated link 306, 308, 310 provides for redundancy in case of failure of one link member or an individual switch in the cluster switch 100.

As further depicted in FIG. 4, a broadcast packet 310 is received by edge switch X for broadcast to other clients connected to the cluster switch 100. The dashed lines 312, 314, 316, 318, 320, and 322 indicate the paths taken by the broadcast packet 310 from edge switch X through the cluster switch 100 to edge switches Y and Z. As depicted in FIG. 4, the broadcast packet 310 is effectively flooded to each of the individual switches A-D of the cluster switch 100 to ensure that the broadcast packet 310 reaches intended recipients.

Each of the link members of the aggregated link 306, 308, or 310 has a link ID (identifier). Thus, in the aggregated link 306, link member 306A has ID1, and link member 306B has ID2. Similarly, the aggregated link 308 has link member 308A assigned ID1, and link member 308B assigned ID2; and the aggregated link 310 has link member 310A assigned ID1, and link member 310B assigned ID2.

As the broadcast packet 310 traverses through the edge switch X and switches A, B, C, D, packet lookups (using lookup tables) are performed at each of the switches to determine which of the link members of the corresponding aggregated link to take. A lookup table can be organized in one of various different ways. For example, the lookup table can map MAC (medium access control) addresses, or some portion of the MAC addresses, to link member IDs. Alternatively, the lookup table can map at least a portion of IP addresses in a received packet to link member IDs.

In the example depicted in FIG. 4, the packet lookup result is that the link member having ID2 is to be used for communicating the broadcast packet 310 through each switch. Thus, upon receipt of the broadcast packet 310, edge switch X performs a packet lookup to determine that the broadcast packet 310 is to be forwarded along link member 306B to the cluster switch 100. The broadcast packet 310 is received by switch B in the cluster switch 100. Switch B then performs a packet lookup (at 324) to determine that link member having ID2 is to be used for forwarding the broadcast packet 310.

Another task performed by switch B is to forward the broadcast packet 310 to each of the other individual switches in the cluster switch 100: switch A over path 314, switch C over path 316, and switch D over path 318. Note that the paths 314, 316, and 318 depicted in FIG. 4 are virtual tunnels through which corresponding broadcast packets 310 are sent. The broadcast packet 310 received by switch A is dropped, since no client (other than the originating edge switch X) is connected to switch A. In other words, switch A does not forward the broadcast packet 310 to another client.

The broadcast packet 310 received by switch D over path 318 is processed by performing an additional packet lookup in switch D. The packet lookup indicates that the broadcast packet 310 is to be forwarded over link member 308B (having ID2) to edge switch Y (path 320 in FIG. 4). Similarly, switch C also performs a packet lookup using a lookup table in switch C, which indicates that the broadcast packet 310 is to be forwarded along link member 310B to edge switch Z (path 322 in FIG. 4).

To avoid loops, the forwarding of packets by the individual switches of the cluster switch 100 is according to the following rules. First, traffic that is received over a virtual tunnel is not forwarded to "dual-homed" links. Dual-homed links are links interconnecting multiple individual switches to a common client (such as link members 306A, 306B that interconnect switches A and B to client 300). Thus, for example, in FIG. 4, the broadcast packet received by switch A from switch B over a virtual tunnel is not forwarded by switch A to link member 306A, which is considered a dual-homed link corresponding to the link member 306B over which the original broadcast packet 310 was received. In other words, switch A suppresses the forwarding of a packet over a dual-homed link.

A second rule is that for traffic that is received over a virtual tunnel, an individual switch does not forward the traffic over any other virtual tunnel. Thus, for example, in FIG. 4, the broadcast packet received by switch C is not forwarded by switch C over virtual tunnels to switch A or switch D. Similarly, switch D does not forward the broadcast packet received from switch B over virtual tunnels to other switches (A and C). Similarly, switch A also does not forward the received broadcast packet over virtual tunnels to switches C and D.

Figure 5:
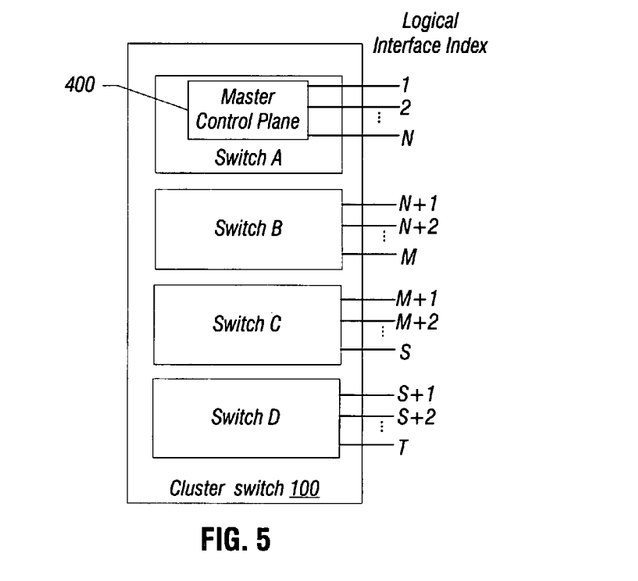
FIG. 5 is a block diagram of a virtual set of ports provided by the cluster switch, wherein each individual switch of the cluster switch has a subset of the set of ports, in accordance with an embodiment.

FIG. 5 shows ports of the cluster switch 100. In the example of FIG. 5, switch A includes a master control plane 400 (which corresponds to master module 130 in FIGS. 1A-1C). As depicted in FIG. 5, a total of T ports are associated with cluster switch 100, where the T ports are divided among the four switches A, B, C, and D. Ports 1–N are associated with switch A, ports N+1 to M (where M is equal to 2*N) are associated with switch B, ports M+1 to S (where S is equal to 3*N) are associated with switch C, and ports S+1 to T (where T is equal to 4*N) are associated with switch D.

As further depicted in FIG. 5, a logical interface index is defined for cluster switch 100, where the logical interface index includes index numbers 1-T, which identify the T ports of the cluster switch 100. The logical interface index is provided by the master control plane 100 to upper layer protocol to emulate a logical cluster switch having a total of T ports.

State machines associated with the logic for the upper layer protocols are executed on a maximum of all T ports. Thus, for example, if all ports are members of a spanning tree group, then the spanning tree logic can be operated on all T ports.

Operation of all switches in the cluster switch 100 is under control of the master control plane 400. Control plane packets are communicated between cluster members (switches A-D) through the virtual tunnels discussed above.

Figure 6:
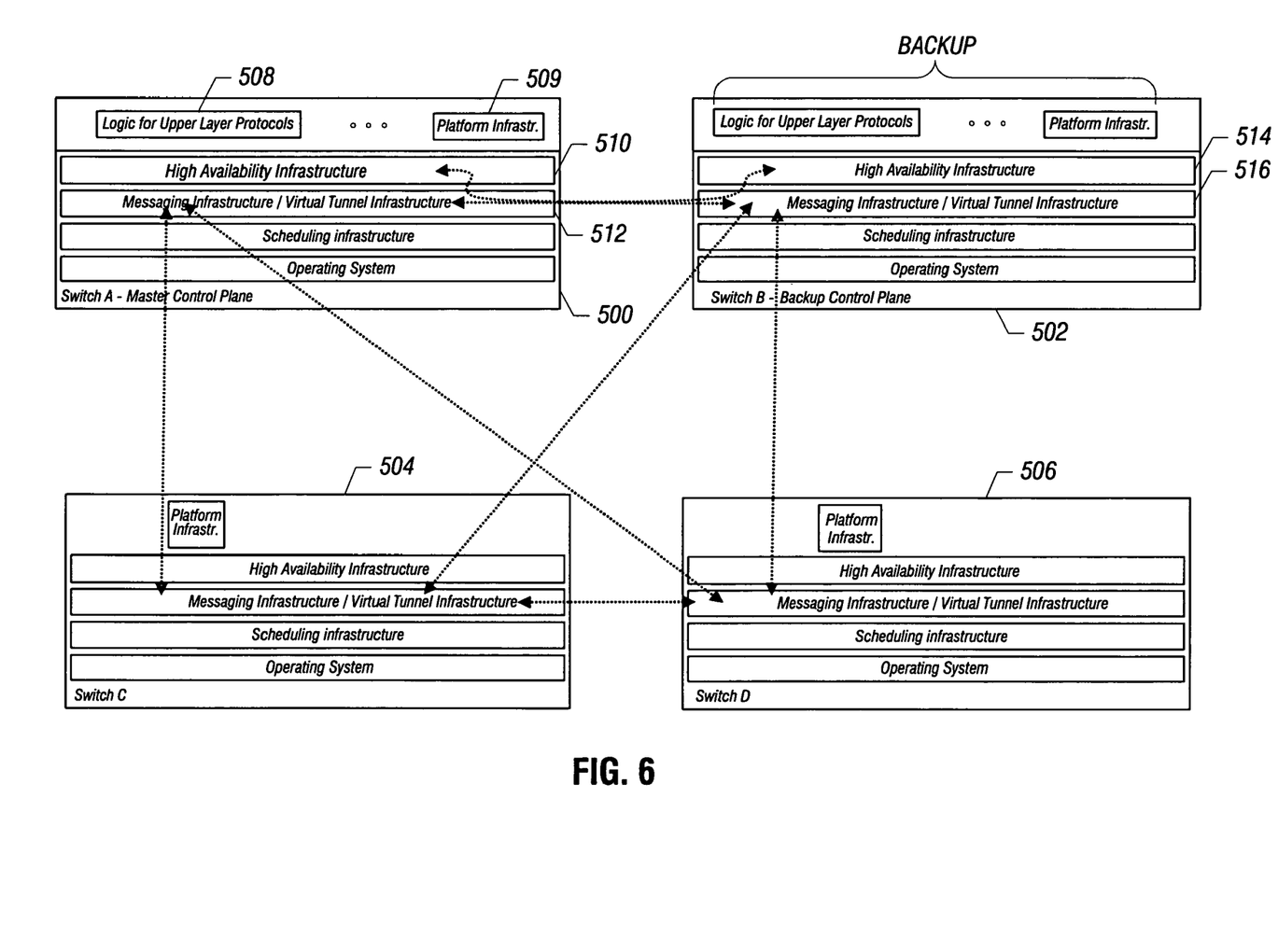
FIG. 6 is a block diagram of layers in the control planes of the individual switches of the cluster switch, in accordance with an embodiment.

FIG. 6 illustrates an example arrangement of control planes 500, 502, 504, and 506 of switches A, B, C, and D, respectively. The control plane 500 of switch A is the master control plane, whereas the control plane 502 in switch B is the backup control plane that can take over functions of the master control plane 500 should the master control plane 500 fail for any reason.

As depicted in FIG. 6, the master control plane 500 includes logic 508 for upper layer protocols. The logic can be implemented with various software modules that are executable on one or more processors of switch A.

Also included in the master control plane 500 is a high availability infrastructure 510 that communicates through a messaging/virtual tunnel infrastructure 512 with a messaging/virtual tunnel infrastructure 516 and a high availability infrastructure 514 in the backup control plane 502. The high availability infrastructures 510 and 514 are designed to allow for detection of failure of the master control plane 500 in switch A in response to which the backup control plane 502 can take over as the master control plane.

As indicated by the bi-directional dashed arrows in FIG. 6, each messaging/virtual tunnel infrastructure in a particular control plane of a switch is able to communicate with the corresponding messaging/virtual tunnel infrastructure of a peer switch.

The upper protocol layer logic of the master control plane 500 also includes a platform infrastructure 509 that includes logic for managing switch A. Each of the other switches also includes a corresponding platform infrastructure. However, it is noted that the control planes 504 and 506 do not include other logic for upper layer protocols that are part of the master and backup control planes 500, 502. This is due to the fact that the control interface to the upper protocol layer logic is presented by the master control plane 500 (or by the control plane 502 if the control plane 500 should fail).

Each control plane also includes a scheduling infrastructure to perform scheduling of communication of traffic. Each control plane also includes an operating system.

The layers depicted in FIG. 6 are provided for purposes of example. In other implementations, other or alternative layers can be provided.

Figure 7:
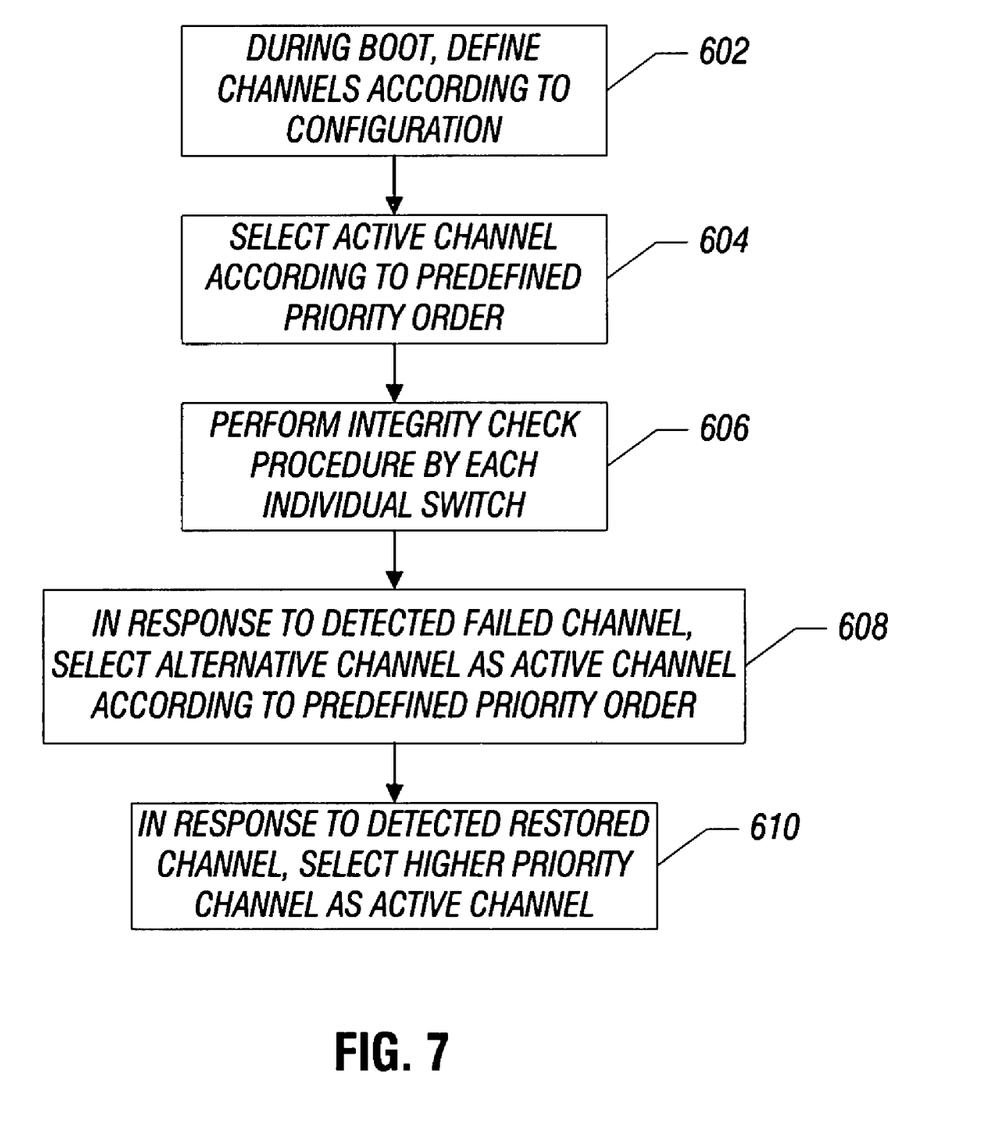
FIG. 7 is a flow diagram of a procedure performed by the cluster switch, according to an embodiment.

FIG. 7 illustrates a flow diagram of a procedure performed by the cluster switch. During booting of the cluster switch, channels are defined (at 602) according to a particular configuration. The configuration provides a static definition of the channels such that the particular route of the channels does not change during operation of the cluster switch. Next, in each virtual tunnel, an active channel is selected (at 604) according to the predefined priority order of channels in each virtual tunnel.

During operation, an integrity check procedure is performed (at 606) to determine whether one or more channels in the virtual tunnels have failed. Note that the integrity check is performed independently by each individual switch.

In response to detecting a failed channel, an individual switch selects (at 608) an alternate channel as the active channel, again according to the predefined priority order for the channels of the corresponding virtual tunnel. At some later point in time, the switch may detect that the previously failed channel has been restored to a functional state. In response to detecting a restored channel, a higher priority channel (which can be the restored channel) of a virtual tunnel is selected (at 610) as the active channel, according to the predefined priority order. In some implementations, recovering channels after failure restoration are not activated instantaneously, but after a grace period to allow de-bounce in the cluster switch. This avoids the situation where a previously failed channel is temporarily restored, only to suffer failure again relatively soon. Performing restoration only after a grace period has passed enhances efficiency and improves stability of the cluster switch.

In accordance with some embodiments, packets communicated through the tunnels between individual switches can use a MAC-in-MAC header format. Such packets are referred to as MAC-in-MAC packets. MAC stands for medium access control. Use of MAC-in-MAC, which provides for inner MAC source and destination addresses and outer MAC source and destination addresses, allows the MAC addresses of different domains to be isolated from each other.

One MAC destination address can be assigned per switch's forwarding plane (or port). Also, one MAC destination address can be assigned per control plane CPU (e.g., control processor 203 in FIG. 3) per quality of service (QoS). Different control plane packets can use different MAC destination addresses based on QoS. There also can be a different MAC destination address assigned per control plane message bus, which is used for application-to-application messaging in a system.

Figure 8:
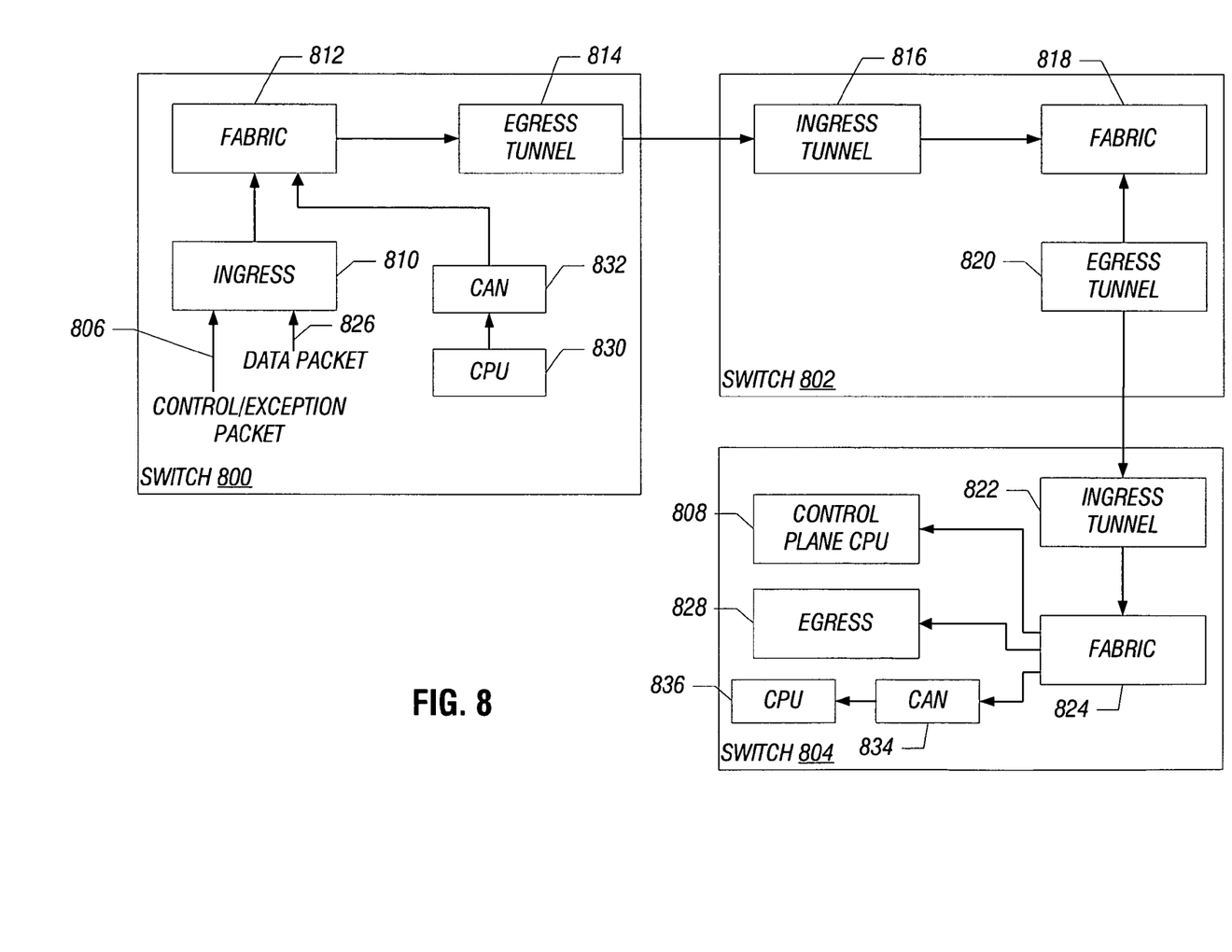
FIG. 8 is a block diagram of an example cluster switch.

With reference to FIG. 8, examples of the various types of data/control communications are described below. Three switches, 800, 802, and 804 of a cluster switch are depicted in FIG. 8. In a first example, a control/exception packet is received (at 806) by the switch 800 (ingress switch). The control/exception packet is encapsulated in a MAC-in-MAC packet that is to be tunneled through an intermediate switch 802 to a destination in the switch 804, where the destination is a control plane CPU 808 in the switch 804.

The control/exception packet 806 is received by an ingress port 810 in the ingress switch 800, which forwards the control/exception packet 806 to a switch fabric 812 in the switch 800. The control/exception packet received by the switch fabric 812 has an outer MAC destination address that identifies the remote control plane CPU 808 in the switch 804 as the destination. The control/exception packet also has an outer MAC source address that is the address of the local data plane port in the ingress switch 800. The switch fabric 812 forwards the control/exception packet to an egress tunnel 814, which forwards the packet to an ingress tunnel 816 in the intermediate switch 802. Based on the outer MAC destination address, the ingress tunnel 816 causes the control/exception packet to be forwarded through the switch fabric 818 and an egress tunnel 820 of the intermediate switch 802 to the destination switch 804.

The control/exception packet is received through an ingress tunnel 822 of the destination switch 804, which detects that the outer MAC destination address matches a MAC address in the switch 804. The ingress tunnel 822 then forwards the control/exception packet through a switch fabric 824 of the switch 804 for receipt by the control plane CPU 808.

In another example, data packet forwarding is illustrated. In this example, a data packet is received (at 826) by the ingress port 810 of the ingress switch 800. The ingress port 810 forwards the data packet to the switch fabric 812. The data packet is also a MAC-in-MAC packet, which has an outer MAC destination address that is the address of a remote data plane port at the switch 804, and an outer MAC source address that is the address of the local data plane port. The data packet is forwarded by the switch fabric 812 through the same path as for the control/exception packet to the switch 804. At the switch 804, the ingress tunnel 822 detects that the outer MAC destination address is outside the switch 804. As a result, the ingress tunnel 822 strips the outer MAC addresses from the packet and forwards the modified data packet to the switch fabric 824 for forwarding to an egress port 828 of the switch 804, such that the data packet can be transmitted to the appropriate remote destination.

Yet another example involves inter-switch messaging forwarding, where a CPU 830 in the switch 800 transmits a message that is intended for another switch, in this example switch 804. The inter-switch message is also a MAC-in-MAC packet. The inter-switch message is forwarded through a chassis area network (CAN) 832 in the switch 800, which forwards the inter-switch packet to the switch fabric 812 for communication through the same path as discussed above to the destination switch 804. At the destination switch 804, the ingress tunnel 822 determines that the inter-switch message is to be forwarded to the CAN 834 of the switch 804. The CAN 834 forwards the inter-switch message to the destination CPU 836 in the switch 804.

In accordance with some embodiments, within each switch, two-tier destination lookup can be performed, where the two-tier destination lookup is between local and remote destinations. The cluster switch prefers local destinations over remote destinations. If a packet is routed to a remote destination, then the packet is forwarded to a remote switch, where the remote switch can route the packet to a local destination of the remote switch. This avoids the possible looping of having the remote switch find a remote location.

For routed unicast packets, an ingress switch performs routing on the packets and the egress switch performs bridging for the packets. For example, the ingress switch can perform changes to the MAC source address and MAC destination address and/or to the time-to-live (TTL) field before the packet is sent across a tunnel.

For routed multicast packets, the ingress switch performs bridging, while the egress switch performs routing for receiving ports on the egress switch. An internal multicast packet sent across a tunnel is unchanged. Any change on the MAC source address or the TTL field is performed at the egress switch.

In performing the two-tier destination lookup, a switch checks the destination address of a packet to see if a local destination is specified. If so, then the header of the packet is modified for routing to the local port. On the other hand, if no local destination can be found, the switch selects a remote location, and the header is modified to allow the packet to be routed over a tunnel to another switch in the cluster switch.

In some embodiments, three types of heartbeat mechanisms can be provided. A first type of heartbeat mechanism is described above, in connection with keep-alive messages exchanged across a tunnel to indicate whether channels of a tunnel are active.

Additionally, another heartbeat mechanism includes an internal switch fabric heartbeat mechanism, which monitors internal ports within a switch to indicate which ports of the switch fabric are functional and which are not.

Another type of heartbeat mechanism is an external heartbeat mechanism, which is sent through an external port of a switch to determine which external ports are functional and which are not.

The status of the internal ports of the internal switch fabric and the status of the external ports of a switch can be communicated through the tunnels of the cluster switch so that other switches can be made aware of such status. Maintaining such status information allows for faster failover.

Instructions of various software modules (e.g., upper layer logic and other layers of a control plane and/or data plane) are loaded for execution on corresponding processors. Processors include microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more machine-readable or computer-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While some embodiments have been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method for use in a communications network, comprising:
    providing an abstraction layer in a virtual cluster switch having plural individual switches;
    communicating control traffic and data traffic over virtual tunnels between corresponding pairs of the individual switches of the cluster switch, wherein each of the virtual tunnels between a corresponding pair of the individual switches has an active channel and at least one standby channel; and
    presenting, by the abstraction layer, an interface having a set of ports to upper layer logic in the cluster switch, wherein the set of ports includes a collection of ports of the individual switches,
    wherein providing the abstraction layer comprises providing the abstraction layer that hides underlying physical infrastructure from the upper layer logic, wherein the underlying physical infrastructure provides the virtual tunnels.

2. The method of claim 1, wherein communicating the control traffic and data traffic over each virtual channel occurs over the corresponding active channel but not the corresponding at least one standby channel.

3. The method of claim 1, wherein providing the abstraction layer comprises providing a master module in one of the individual switches, the master module managing the plural individual switches in the cluster switch.

4. A method for use in a communications network, comprising:
    providing an abstraction layer in a virtual cluster switch having plural individual switches;
    communicating control traffic and data traffic over virtual tunnels between individual switches of the cluster switch, wherein each virtual tunnel has an active channel and at least one standby channel;
    presenting, by the abstraction layer, an interface having a set of ports to upper layer logic in the cluster switch, wherein the set of ports includes a collection of ports of the individual switches; and
    defining a predefined priority order for the channels in each virtual tunnel.

5. The method of claim 4, further comprising:
    performing an integrity check of the active channel of a particular one of the virtual tunnels to detect failure of the active channel; and
    in response to detecting failure of the active channel of the particular virtual tunnel, performing further communication of control traffic and data traffic over the at least one standby channel of the particular virtual tunnel.

6. The method of claim 4, further comprising selecting a first one of the channels in a particular one of the virtual tunnels as the active channel according to the predefined priority order.

7. The method of claim 6, further comprising:
    in response to detecting failure of the first channel, selecting a second one of the channels of the particular virtual tunnel as the active channel according to the predefined priority order.

8. The method of claim 7, further comprising:
    detecting restoration of the first channel; and
    in response to the detecting the restoration, re-selecting the first channel as the active channel and designating the second channel as a standby channel.

9. The method of claim 4, further comprising connecting the cluster switch to plural clients over respective aggregated links, wherein each aggregated link includes at least two link members connected to different individual switches of the cluster switch.

10. The method of claim 9, further comprising:
receiving traffic from a first one of the clients at a first one of the individual switches in the cluster switch; and
forwarding, from the first individual switch, the traffic to each of other individual switches in the cluster switch.

11. The method of claim 9, further comprising:
receiving traffic from a first one of the clients at a particular one of the individual switches in the cluster switch;
determining, at the particular individual switch, whether the particular individual switch is coupled to a target client; and
in response to determining that the particular switch is coupled to the target client, the particular individual switch performing a table lookup to identify whether the received traffic is to be forwarded over a link member of an aggregated link coupling the particular individual to the target client.

12. The method of claim 4, further comprising:
communicating MAC-in-MAC packets over the virtual tunnels.

13. The method of claim 4, further comprising:
performing a two-tier destination lookup in each of the individual switches.

14. The method of claim 4, further comprising:
communicating at least one of internal switch fabric port status and external port status through the virtual tunnels.

15. A first switch comprising:
a master module for a cluster switch that includes plural individual switches, the plural individual switches including the first switch, wherein the master module is configured to provide an abstraction layer that hides underlying physical infrastructure from upper layer logic in the cluster switch, and wherein the master module is configured to manage the plural individual switches in the cluster switch;
one or more data planes connected to respective virtual tunnels to peer individual switches in the cluster switch, wherein each virtual tunnel has an active channel over which traffic is communicated, and at least one standby channel over which traffic is not communicated, and wherein the underlying physical infrastructure provides the virtual tunnels,
wherein the abstraction layer is configured to present a set of ports that includes a collection of ports of the individual switches.

16. The first switch of claim 15, wherein the master module is configured to define an index for the set of ports that is a combination of ports of the individual switches, wherein the first switch further comprises:
a portion of the upper protocol layer logic that is presented the index to allow the upper protocol layer logic to access the set of ports.

17. The first switch of claim 15, wherein the individual switches of the cluster switch are interconnected by physical links, and wherein a particular one of the virtual tunnels has a first channel that is defined on a first number of physical links, and a second channel that is defined on a second, different number of physical links.

18. The first switch of claim 15, wherein the channels in each of the virtual channels has a predefined priority order, wherein the active channel of each of the virtual channels is selected according to the predefined priority order.

19. An article comprising at least one computer-readable storage medium containing instructions that when executed cause at least one processor in a cluster switch to:
communicate traffic over virtual tunnels interconnecting individual switches of the cluster switch, wherein each virtual tunnel has an active channel and at least one standby channel;
define a master control plane in one of the individual switches to manage each of the individual switches of the cluster switch; and
detect for failures of channels in the virtual tunnels to allow for selection of alternate channels in response to detected failures.

20. The article of claim 19, wherein the instructions when executed cause the at least one processor of the master control plane presents a set of ports to upper protocol layer logic, wherein the set of ports is a collection of ports of the individual switches.

21. The article of claim 19, wherein the instructions when executed cause the at least one processor to:
define a predefined priority order for the channels in each virtual channel.

22. The article of claim 21, wherein the instructions when executed cause the at least one processor to:
select a first one of the channels in a particular one of the virtual tunnels as the active channel according to the predefined priority order.

23. The article of claim 22, wherein the instructions when executed cause the at least one processor to:
in response to detecting failure of the first channel, select a second one of the channels of the particular virtual tunnel as the active channel according to the predefined priority order.

24. The article of claim 23, wherein the instructions when executed cause the at least one processor to:
detect restoration of the first channel; and
in response to the detecting the restoration, re-select the first channel as the active channel and designate the second channel as a standby channel.

* * * * *